UNITED STATES PATENT OFFICE.

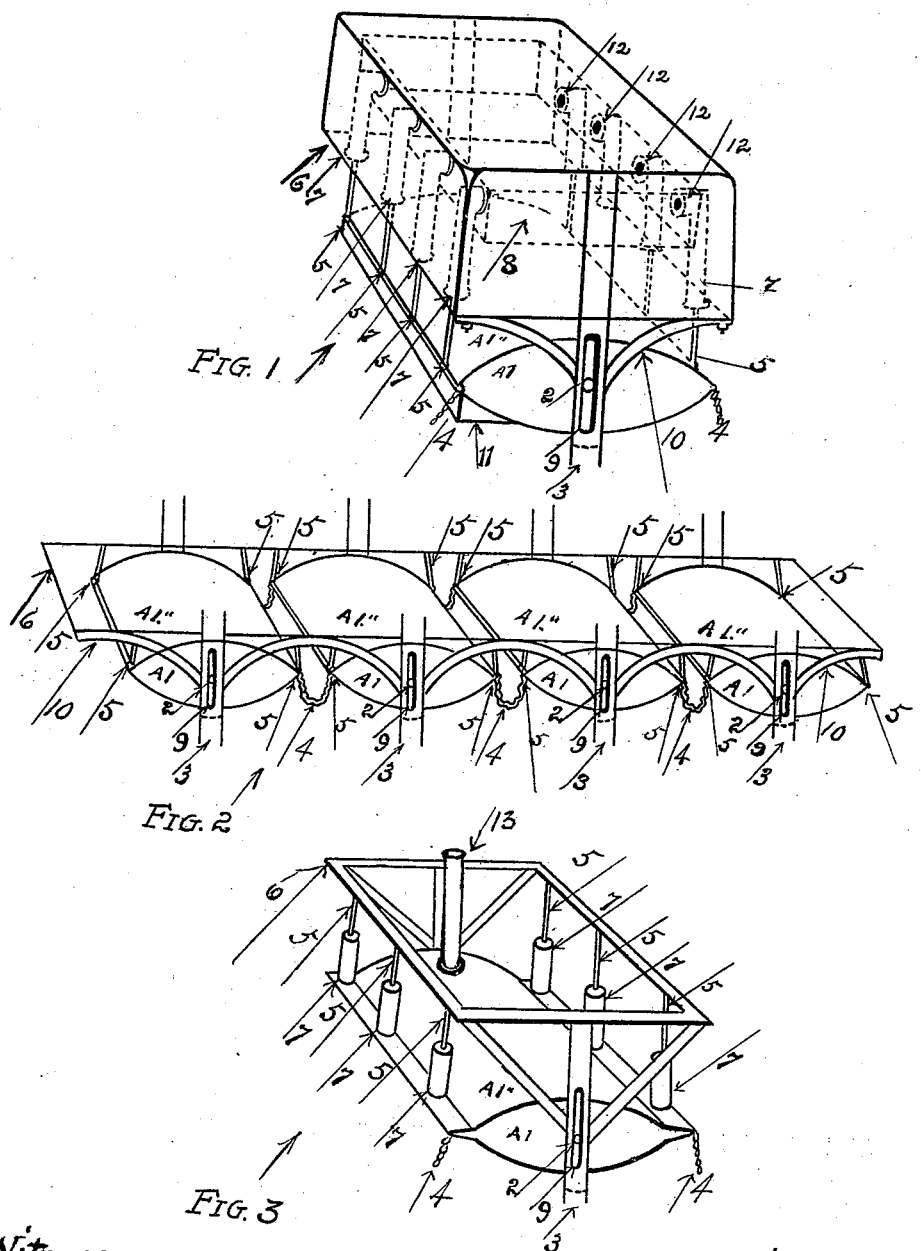

THOMAS WILLANS, OF PHILADELPHIA, PENNSYLVANIA; WILLIAM WILLANS ADMINISTRATOR OF SAID THOMAS WILLANS, DECEASED.

APPARATUS FOR UTILIZING WAVE-POWER.

No. 886,104.   Specification of Letters Patent.   Patented April 28, 1908.

Application filed October 13, 1905. Serial No. 282,681.

*To all whom it may concern:*

Be it known that I, THOMAS WILLANS, a citizen of the United States, residing in the city and county of Philadelphia and State of Pennsylvania, have invented certain new and useful Improvements in Apparatus for Utilizing Wave-Power, of which the following is a specification.

This invention has relation to wave power air compressors and it consists in the novel construction and arrangement of its parts as hereinafter shown and described.

The object of the invention is to provide an apparatus of the nature indicated which is adapted to utilize the force of waves or turbulent water for the purpose of pumping, compressing and storing air.

The apparatus consists primarily of a series of piles having elongated trunnion bearings or slots. Elliptical floats are arranged between the piles. The said floats have vertical ends which are provided at points just below their horizontal medial axes with trunnions which are located in said bearings. A frame work is located upon the upper portions of the said piles and upon said frame a suitable storage tank is located. Pumps are located between the floats and the tank and are operatively connected with both and are adapted to deliver air into the storage tank.

In the accompanying drawings:—Figure 1 is a perspective view of the apparatus. Fig. 2 is a perspective view of a series of elliptical floats with the superstructure removed, and Fig. 3 is a perspective view of a modified form of arrangement of a float and pump illustrating the float as a storage tank also.

The floats $A^1$ in cross section are substantially in the form of acuminate ellipses, having vertical end walls, each of which is provided at a point just below its medial horizontal axes with a trunnion 2. The piles 3—3 are located at the ends of the floats $A^1$, and are provided with the elongated trunnion bearings or slots 9—9 which receive the trunnions 2—2 of the floats $A^1$. The edges of the floats $A^1$—$A^1$ are connected together by the chains 4—4 or other similar flexible elements which limit the oscillatory movement of the said floats.

In the form of the invention as illustrated in Fig. 1 the piston rods 5—5 are attached at their ends to the acuminate edges 4—4 of the floats $A^1$, and the upper ends of the said rods enter the pump cylinders 7—7 which are located under the storage tank 8.

The frame 6 (which also includes the braces 10—10) is mounted upon the piles 3—3 and in turn supports the tank 8. The under side of the float $A^1$ is also provided with a depending flange 11, which forms a pocket, the object of which will be hereinafter explained. The tank 8 is provided with check-valves 12.

In the form of the invention as shown in Fig. 3, the pump cylinders 7—7 are located upon the float $A^1$ and the piston rods 5—5 are attached to the frame 6. In this form of the invention the float $A^1$ also acts as a storage tank for the air received from the pump cylinders 7 and the float is provided with an air outlet pipe or nipple 13.

From the foregoing description it is obvious that as the floats $A^1$, (which rest upon the surface of the water, not shown) oscillate upon their trunnions and move vertically along the piling 3, atmospheric air is pumped through the cylinders 7, into the tank 8. From the said tank the air may be taken and put to any economical or desired use. As the trunnions 2—2 are located below a medial horizontal axis of the float, the turbulent water exerts a greater leverage or pressure upon the float and causes the same to oscillate promptly and positively. The depending flange 11 (see Fig. 1), located upon the under side of the float $A^1$, forms a suction or vacuum box which when filled with water or air, and when its lower edge is below the surface of the water exerts a downward pull upon the float, thereby developing additional oscillatory movement and consequent power.

It will be seen that the floats of my construction have both a bodily vertical movement up and down in the slots 9, and also an oscillatory movement upon the trunnions 2. Thus every least movement of the waves is taken advantage of. The floats are so wide that while rising or falling with the crest of the wave they will take an inclined position parallel with the surface of the water. Thus all the components of the wave produce action upon the pump or power mechanism connected to the floats. This is further taken advantage of by my system of balanced or opposed compressors. Thus if the float moves vertically, as it will do under the influence of a large wave, the compressors on both sides will force air into the reservoir whereas minor variations in the water level caused by wave contour will oscillate the float and draw out the compressing pistons on one side while forcing in those on the other side. In addition to this the oscillatory floats respond to very small wave movements as when the water is comparatively calm and only agitated by short and choppy waves. While it requires considerable strength in a wave to raise floats bodily, comparatively little is required to oscillate a float upon its trunnions.

In the arrangement of the parts as shown in Fig. 3 of the drawing the float $A^1$ serves a double purpose:—viz.—an air pump actuating means and an air storage compartment.

While I have shown and prefer to employ floats as a means of compressing air, yet I do not wish to be limited in the broad application of my principle to this construction as the floats could be connected to other means of developing power from the rise and fall of the floats.

Having described my invention what I claim as new and desire to secure by Letters-Patent is:—

1. A wave power air compressor comprising pumps, axially movable floats connected thereto and flexible elements connecting said floats together.

2. A wave power air compressor comprising pumps, axially movable floats connected thereto and flexible elements connecting the adjacent edges of said floats together.

3. In a wave motor a float with trunnions projecting directly from its ends having oscillatory rotative movement on said trunnions, a framework having vertical slots in which said trunnions are mounted, said float thus having both free bodily vertical movement and an oscillatory movement, and means located on opposite sides of the trunnions of the float independent of each other, connecting the float with mechanism for converting the said oscillatory and bodily vertical movements of the float into power.

4. In a wave motor, a float having trunnions projecting directly from its ends and having an oscillatory rotative movement on said trunnions, said float having also a free bodily vertical movement, and mechanism connected to the margin of the float at one side of the trunnions whereby the said oscillatory and bodily vertical movements can be converted into power.

5. In a wave motor, vertically slotted float supports, a float having trunnions at either end entering said slots, and mechanism connected to the margin of said float at one side of its vertical axis for converting the oscillatory and bodily vertical movements into power.

6. In a wave motor, an air reservoir, a float having trunnions projecting directly from its ends and having oscillatory rotative movement on said trunnions, said float having also a free bodily vertical movement, and mechanism connected to the margin of said float for compressing the air in said reservoir.

7. In a wave power air compressor, a reservoir, slotted float supports, a float having trunnions at each end entering said slots, pistons located on the margin of the float, and air compressors in which said pistons operate connected to the said reservoir.

8. In a wave power air compressor, a reservoir, slotted float supports, a float having trunnions at each end entering said slots, a series of pistons located on opposite margins of the float, and air compressors in which said pistons operate connected to said reservoir.

9. In a wave motor, a movable float having trunnions located upon its ends, a framework having vertical slots in which said trunnions are received, a reservoir located vertically above said float on its framework, air compressing pumps connected to said reservoir, and rods connecting the pistons of said pumps with said float in such manner that either a vertical or oscillatory movement of the float will actuate the pistons to compress the air in said reservoir.

10. In a wave motor, a float so mounted and anchored as to have universal oscillatory movement due to wave action as well as a bodily vertical movement due to the same action, and mechanism directly connected to said float at manifold points for converting both the oscillatory and the bodily vertical movements into power.

THOMAS WILLANS.

Witnesses:
HIRAM HOFFMAN,
JOHN O'CONNELL.